United States Patent [19]

Kume

[11] Patent Number: 5,307,380
[45] Date of Patent: Apr. 26, 1994

[54] DELAYING DETECTION CIRCUIT

[75] Inventor: Atsuya Kume, Hyogo, Japan

[73] Assignee: Mitsubishi Denki Kabushiki Kaisha, Tokyo, Japan

[21] Appl. No.: 701,038

[22] Filed: May 16, 1991

[30] Foreign Application Priority Data

Jun. 29, 1990 [JP] Japan .................. 2-171541

[51] Int. Cl.⁵ ............................................. H03D 3/02
[52] U.S. Cl. ................................... 375/84; 375/83; 370/108; 455/214
[58] Field of Search ................... 375/52–56, 375/81, 83, 84, 94, 118, 119, 120; 329/306, 307, 336; 455/205, 214; 370/108

[56] References Cited

U.S. PATENT DOCUMENTS

| 4,064,361 | 12/1977 | Kustka et al. | 329/336 |
| 4,153,814 | 5/1979 | Burgert | 375/83 |
| 4,385,395 | 5/1983 | Tanaka et al. | 375/119 |
| 4,416,016 | 11/1983 | Iapicco | 375/85 |
| 4,422,176 | 12/1983 | Summers | 375/120 |
| 4,456,890 | 6/1984 | Carickhoff | 375/120 |
| 4,580,243 | 4/1986 | Renner et al. | 370/108 |
| 4,613,951 | 9/1986 | Chu | 370/108 |
| 4,737,729 | 4/1988 | Haussmann | 329/336 |
| 4,746,872 | 5/1988 | Yamagata | 375/84 |
| 4,965,810 | 10/1990 | Peischl et al. | 375/84 |

FOREIGN PATENT DOCUMENTS 2180726  4/1987  United Kingdom .
2242339  9/1991  United Kingdom .

Primary Examiner—Stephen Chin
Assistant Examiner—Young Tse
Attorney, Agent, or Firm—Rothwell, Figg, Ernst & Kurz

[57] ABSTRACT

Disclosed here is a delaying detection circuit which is employed for reproducing a digital signal from a received signal and has a constitution in which a present input signal is multiplied with an input signal before one symbol time. The delaying detection circuit according to this invention has a constitution including a plurality of delaying circuits which delays an input signal by respectively different delay times and a synthesis circuit which estimates an input signal before one symbol time based on output signals of these delaying circuits so as not to produce errors in a demodulated data even when one symbol time is not an integer multiple of a period of a carrier wave.

6 Claims, 4 Drawing Sheets

FIG. 2
(PRIOR ART)
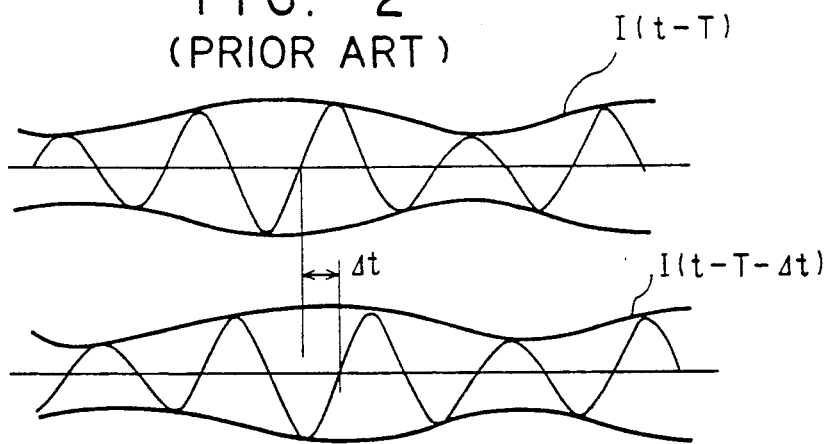
FIG. 5
(A) DELAY = T
FIG. 5
(B) DELAY
= T−Δt+1/2fc
FIG. 5
(C) DELAY
= T+Δt
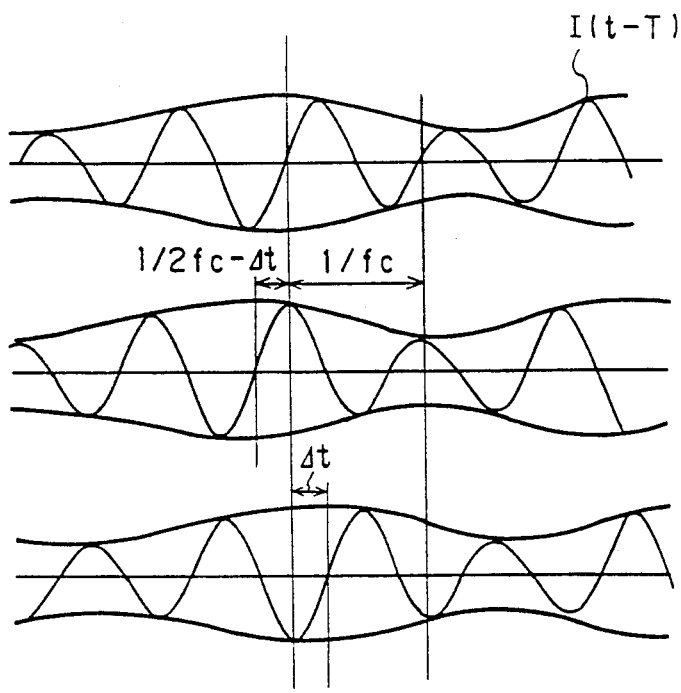
FIG. 5
(D)
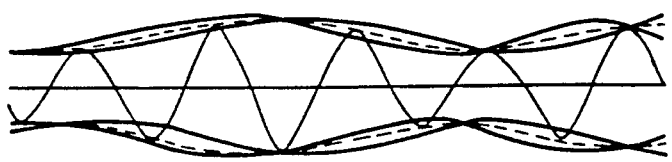

DELAYING DETECTION CIRCUIT

BACKGROUND OF THE INVENTION

1. Field of the Invention

This invention relates to a delaying detection circuit which is employed in a receiving apparatus of a digital communication system, and used for reproduction of a digital signal from a received signal.

2. Description of the Prior Art

FIG. 1 is a block diagram showing a conventional delaying detection circuit which uses a binary PSK (Phase Shift Keying) signal generally employed as an input signal. In FIG. 1, reference numeral 1 is an input terminal of a received signal, 2 a delaying circuit which delays an input signal (a received signal) by one symbol time T, 8 a multiplier which performs multiplication for phase comparison between the received signal and a delay signal output from the delay circuit 2, 9 a lowpass filter for removing high frequency components, and 10 an output terminal of a demodulated data.

Next, the operation will be described. A received signal input from the input terminal 1 is represented by $I(t) \cos 2\pi fct$. Here, fc is a carrier frequency, and $I(t)$ is a data. It is assumed that if the time corresponding to one symbol is represented by T, the data $I(t)$ is A and $-A$ in accordance with a data "0" and "1" at sample points for each T (A is a positive number). Also, it is assumed that one symbol time T can be divided by $1/fc$, that is, $T = n/fc$ (n is an integer).

The received signal is delayed by one symbol time in the delaying circuit 2 to be a delay signal. The multiplier 8 multiplies the received signal itself by the delay signal. The output of the multiplier 8 is as follows.

$$I(t)\cos2\pi fct \cdot I(t - T)\cos2\pi fc(t - T)$$
$$= I(t)\cos2\pi fct \cdot I(t - T)\cos2\pi fc(t - n/fc)$$
$$= I(t)\cos2\pi fct \cdot I(t - T)\cos(2\pi fct - 2\pi n)$$
$$= I(t)\cos2\pi fct \cdot I(t - T)\cos2\pi fct$$
$$= I(t)I(t - T)\cos^2 2\pi fct$$
$$= \frac{1}{2} I(t)I(t - T)(1 + \cos4\pi fct)$$

Since the lowpass filter (LPF) 9 is set so as not to make components of $\cos 4\pi ft$ pass therethrough, the output of the LPF is $\frac{1}{2} \cdot I(t) \cdot I(t-T)$. Accordingly, from the output terminal 10, $\frac{1}{2} \cdot I(t) \cdot I(t-T)$ is output. A code judgement circuit (not shown) provided in the next stage judges a code of $\frac{1}{2} \cdot I(t) \cdot I(t-T)$. When the code is positive, the input signal and the delay signal have the same phase, by which it can be judged that the same symbol as that before one symbol has been received. When the code is negative, the input signal has a different phase from that of the delay signal, by which it can be judged that a different symbol has been received. Incidentally, though the case where the received signal is a binary PSK signal is described here, a plurality of the circuits shown in FIG. 1 are employed in the case where the received signal is a PSK signal having values not less than 4.

By the way, when one symbol time T can not be divided by $1/fc$, the phase of the delay signal which is delayed by one symbol time T does not coincide with that of the received signal, the above-mentioned description does not hold. Namely, $\cos 2\pi fct \neq \cos 2\pi fc(t-T)$. Here, assuming $T = n/fc - \Delta t$, the following equation holds.

$$\cos2\pi fc(t - T) = \cos2\pi fc(t - n/fc + \Delta t)$$
$$= \cos2\pi fc(t + \Delta t)$$

Accordingly, in order to make the phase of the delay signal coincide with that of the received signal, it is necessary to make the delay time be $T + \Delta t$. In this time, the delay signal becomes $I(t - T - \Delta t) \cos 2\pi fct$ as shown in FIG. 2. Accordingly, $\frac{1}{2} \cdot I(t) \cdot I(t - T - \Delta t)$ is output as a demodulated data from the output terminal 10.

Since the conventional delaying detection circuit is constituted as described above, when one symbol tim T is not an integer multiple of the period of the carrier wave, the delay time between the received signal and the delay signal of which phase is compared with that of the received signal is not equal to one symbol time T, and consequently, there are problems that errors yield in the demodulated data and the error rate increases.

SUMMARY OF THE INVENTION

This invention is devised in order to solve the problems described above, and it is an object to obtain such a delaying detection circuit that the delay time between the received signal and the delay signal of which phase is compared with that of the received signal is equal to one symbol time.

The delaying detection circuit related to this invention comprises a plurality of delaying circuits which delay an input signal by respectively different delay times, a synthesis circuit which estimates an input signal before one symbol based on output signals of these delaying circuits, and a phase detection circuit which outputs a demodulated data corresponding to the phase difference between the output signal of the synthetic circuit and the input signal.

The synthesis circuit in this invention estimates the input signal before one symbol time from a plurality of signals having different delay times. Even if one symbol time is not an integer multiple of the period of the carrier wave, the delay signal obtained by delaying the input signal by one symbol time is supplied to the circuit which detects the phase difference.

BRIEF DESCRIPTION OF THE INVENTION

FIG. 2 is a waveform diagram explanatory of the operation of the delaying detection circuit shown in FIG. 1;

Figure 6:
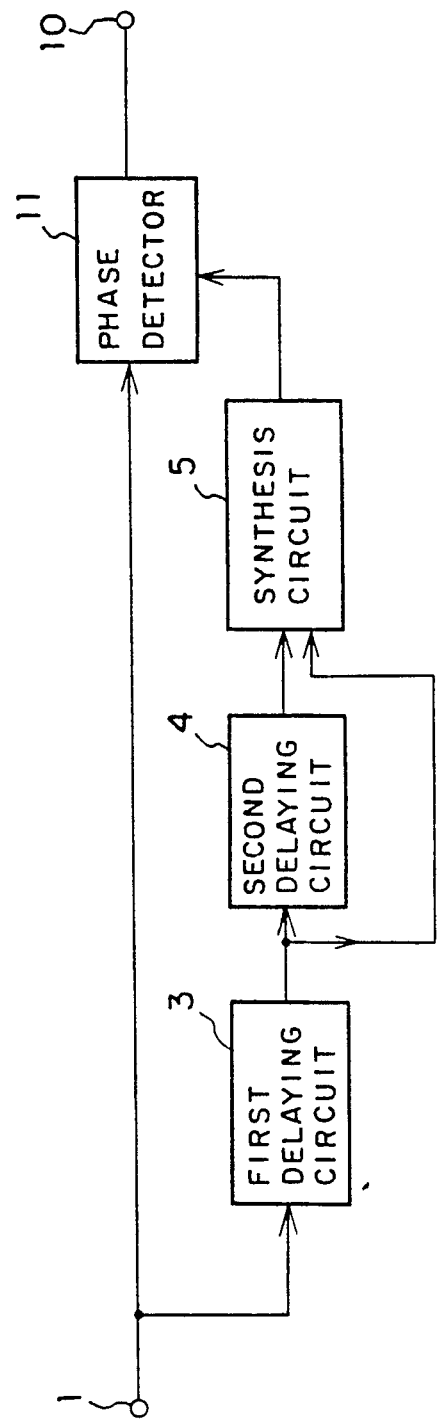
Figure 3:
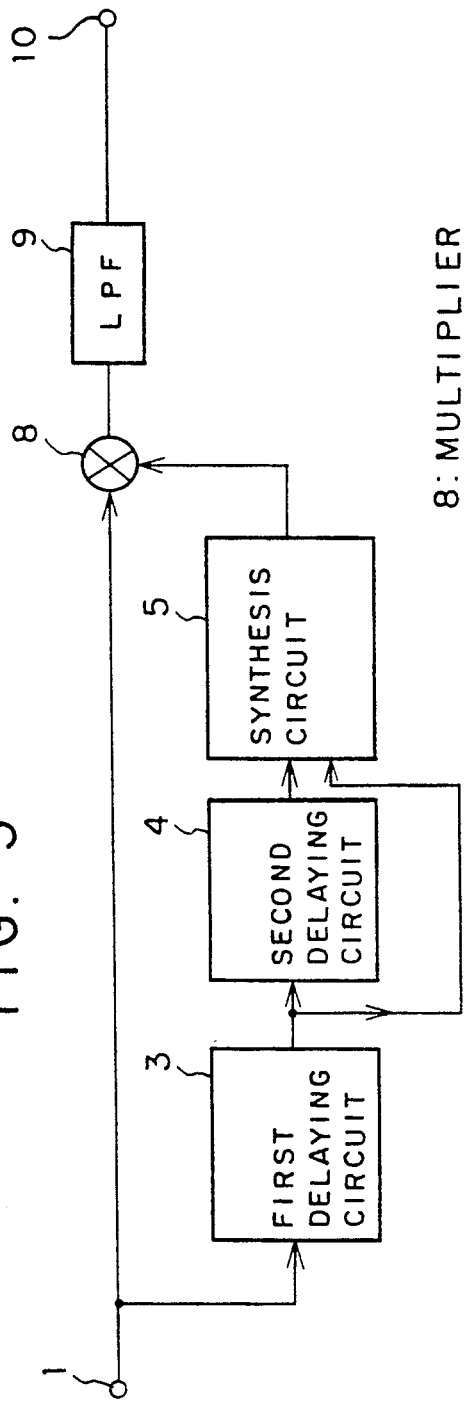
FIG. 3 is a block diagram showing a delaying detection circuit according to a first embodiment of this invention.
Figure 7:
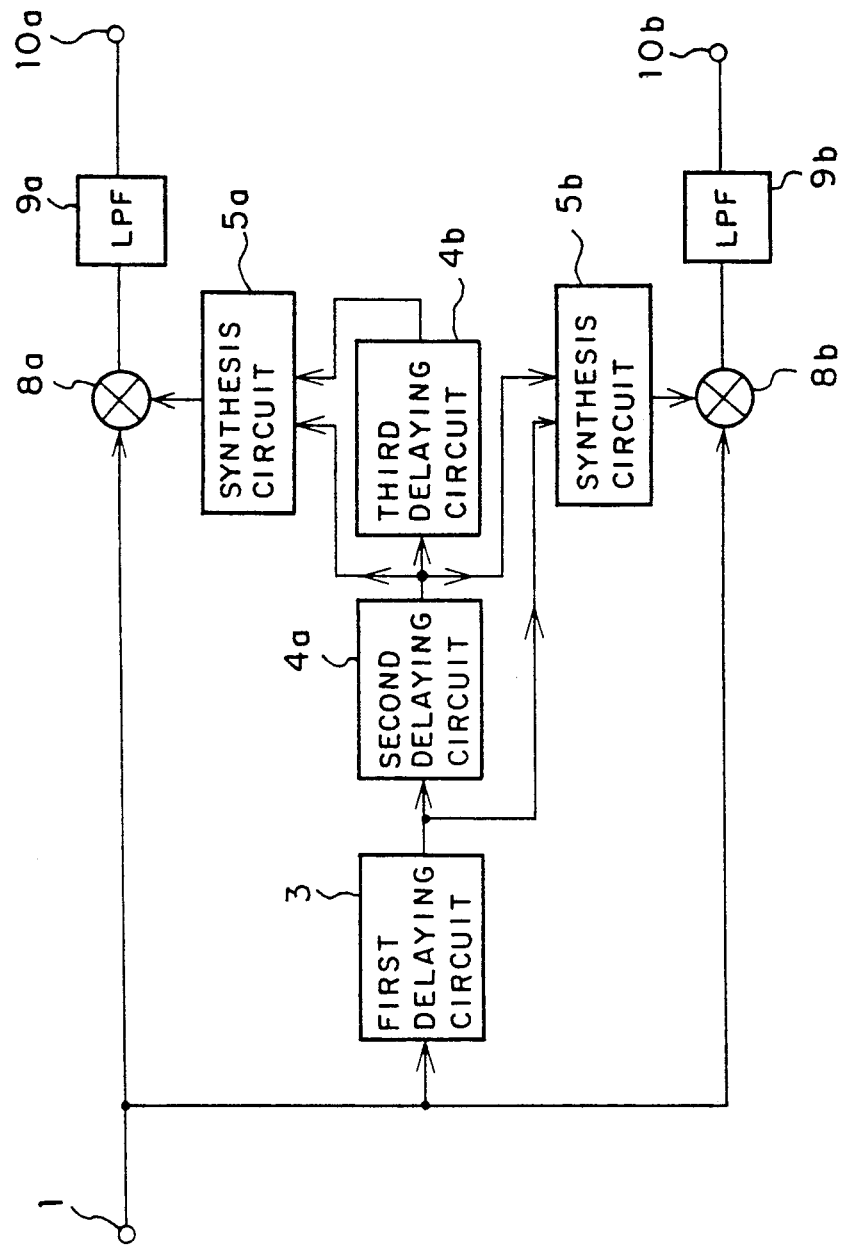

FIG. 5(A)-FIG. 5(D) are a waveform diagram explanatory of the operation of the delaying detection circuit shown in FIG. 3;

FIG. 6 is a block diagram showing a delaying detection circuit according to a second embodiment of this invention; and FIG. 7 is a block diagram showing a delaying detection circuit according to a third embodiment of this invention.

DETAILED DESCRIPTION OF THE PREFERRED EMBODIMENTS

Figure 1:
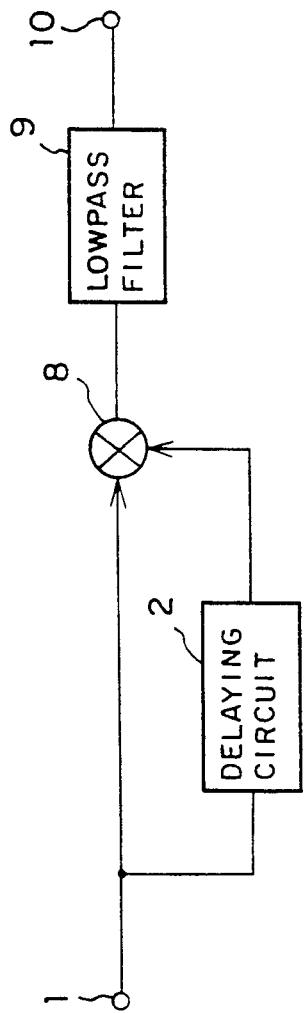
FIG. 1 is a block diagram showing a conventional delaying detection circuit.

Embodiments according to this invention will be described with reference to drawings below. In FIG. 3, reference numeral 3 is a first delaying circuit which delays a received signal by about one symbol time, 4 a second delaying circuit which further delays an output of the first delaying circuit 3, and 5 a synthesis circuit which introduces outputs of the first and second delaying circuits and outputs an estimated delay signal obtained by delaying the received signal by one symbol time. The other parts are identified by the same numerals as those shown in FIG. 1.

Next, operation will be described. In this case, also a binary PSK signal is examplified as a received signal. It is assumed that a received signal input from the input terminal 1 is represented by $I(t) \cos 2\pi fct$. Here, fc shows a carrier frequency, and $I(t)$ shows a data. It is assumed that $I(t)$ is $+A$ and $-A$ corresponding to the data "0" and "1" at sample points for each T (A is a positive number). $T = n/fc - \Delta t$ (n is an integer, $0 \leq \Delta t < 1/fc$).

The received signal is input to the first delaying circuit 3 to be delayed by a proper time $T - \Delta t_1$, and further it is delayed in the second delay circuit 4 by $\Delta t_1 + \Delta t_0$. That is, the received signal is delayed in total by $T + \Delta t_0$. As an example, let us consider the case where $0 \leq \Delta t < \frac{1}{2}fc$, $\Delta t_1 = \frac{1}{2}fc - \Delta t$, and $\Delta t_0 = \Delta t$ hold. In this time, the output of the first delaying circuit 3 is represented as follows.

$$\begin{aligned}
I(t - T + \Delta t_1)&\cos 2\pi fc(t - T + \Delta t_1) \\
&= I(t - T + 1/2fc - \Delta t)\cos 2\pi fc(t - n/fc + \Delta t + 1/2fc - \Delta t) \\
&= I(t - T + 1/2fc - \Delta t)\cos 2\pi fc(t - n/fc + 1/2fc) \\
&= -I(t - T + 1/2fc - \Delta t)\cos 2\pi fct
\end{aligned} \quad (1)$$

FIG. 5(B) shows an example of the output of the first delaying circuit 3 in the case where $I(t-T) \cos 2\pi fct$ is used as the reference. The output of the second delaying circuit 4 is represented as follows.

$$\begin{aligned}
I(t - T - \Delta t_0)&\cos 2\pi fc(t - T - \Delta t_0) \\
&= I(t - T - \Delta t)\cos 2\pi fc(t - n/fc + \Delta t - \Delta t) \\
&= I(t - T - \Delta t)\cos 2\pi fc(t - n/fc) \\
&= I(t - T - \Delta t)\cos(2\pi fct - 2n\pi) \\
&= I(t - T - \Delta t)\cos 2\pi fct
\end{aligned} \quad (2)$$

FIG. 5(C) shows an example of the output of the second delaying circuit 4. The synthesis circuit 5 estimates $I(t-T)\cos 2\pi fct$ from the outputs of the first and second delaying circuits 3 and 4. The estimated delay signal is shown by a broken line in FIG. 5(D). As a method of estimation, for example, linear approximation is considered. In short, if it is assumed that $I(t)$ varies linearly, $I(t-T)$ can be approximated as follows.

$$I(t - T) \approx \{\Delta t \cdot I(t - T + 1/2fc - \Delta t) + (1/2fc - \Delta t) \cdot I(t - T - \Delta t)\}/(1/2fc)$$

Figure 4:
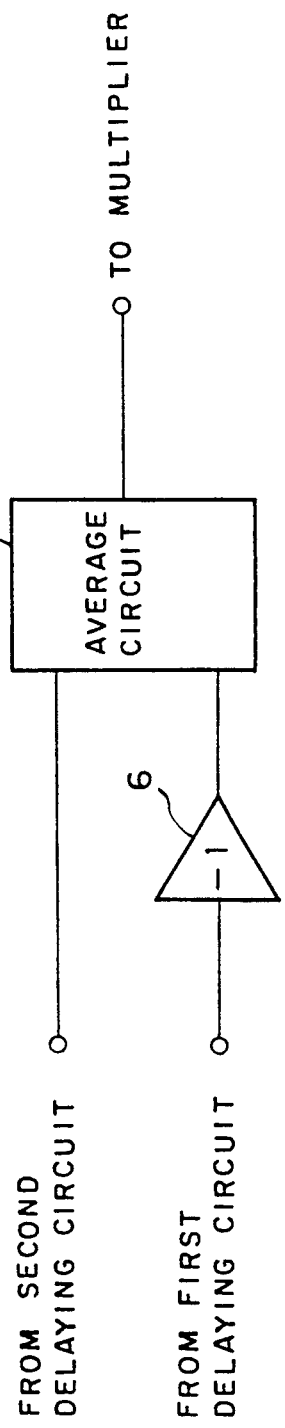
FIG. 4 is a block diagram showing a constitutional example of a synthesis circuit.

Especially, when $\Delta t = \frac{1}{4}fc$, since the expressions (1) and (2) become (3) and (4), respectively, $$-I(t - T + 1/2fc - \Delta t)\cos 2\pi fct = -I(t - T + 1/4fc)\cos 2\pi fct \quad (3)$$

$$I(t - T - \Delta t)\cos 2\pi fct = I(t - T - 1/4fc)\cos 2\pi fct \quad (4)$$

the synthesis circuit 5 can be implemented by an inverter 6 for inverting the output of the first delaying circuit 3 and an average circuit 7 for taking the average between the output of the inverter 6 and the output of the second delaying circuit 4 as shown in FIG. 4. The estimated delay signal which the synthesis circuit 5 outputs and the received signal are multiplied with each other by the multiplier 8 in the same way as in the conventional case. Further, the demodulated data $\frac{1}{2} I(t-T)$ is output from the LPF 9.

Incidentally, though, in the above-mentioned embodiment, the case where $0 \leq \Delta t < \frac{1}{2}$ fc holds is described, the estimated delay signal can be also obtained in the same way as in the above-mentioned embodiment in the case where $\frac{1}{2}$ fc $\leq \Delta t < 1/fc$ holds.

Though an example in which the multiplier 8 and the LPF 9 are provided as a phase detection circuit in the above-mentioned embodiment, the multiplier 8 and the LPF 9 have various kinds of constitutions, and, in general, the phase detection circuit can be represented as a phase detector 11 as shown in FIG. 6.

Also, though the delaying detection circuit has been described in the above-mentioned embodiment, an AFC (Automatic Frequency Control) circuit may exhibits the same effect as the above-mentioned embodiment. By the way, though in the above-mentioned embodiment, the case where the received signal is a binary PSK signal has been described, the AFC circuit is applicable to the case where the received signal is an other signal such as a four-value PSK signal. FIG. 7 is a block diagram showing a constitutional example in the case where the received signal is a four-value PSK signal. In FIG. 7, reference numeral 4a is a second delaying circuit, 4b is a third delaying circuit, 5a and 5b each are a synthesis circuit, 8a and 8b each are a multiplier, 9a and 9b each are a LPF, and 10a and 10b each are an output terminal. In this case, the synthesis circuit 5a estimates a delay signal from the output of the second delaying circuits 4a and the output of the third delaying circuit 4b, and the synthesis circuit 5b estimates a delay signal from the output of the first delaying circuit 3 and the output of the second delaying circuit. The multipliers 8a and 8b and the LPFs 9a and 9b operate in the same way as the multiplier 8 and the LPF 9 shown in FIG. 3, and output a demodulated data.

As described above, according to this invention, since the delaying detection circuit is constituted in such a manner that outputs of a plurality of delaying circuits are synthesized to estimate a delayed signal, even in the case where one symbol time is not an integer multiple of the period of the carrier wave, errors in the demodulated data can be made small, and consequently, there is an effect that a good demodulation characteristic can be obtained.

What is claimed is:

1. A delaying detection circuit for time delaying and detecting a phase shift keying modulated digital input signal based on a time delay of the input signal and the comparison of the phase difference between the time delayed input signal with the input signal comprising:
   a plurality of delaying circuits connected to receive said digital input signal and including means for effecting the substantially simultaneous time delay of said digital input signal by respectively different delay times and for outputting substantially simultaneously a plurality of time delayed signals representing said input signal delayed by said respectively different delay times;

a synthesis circuit connected to receive the plurality of time delayed output signals of said delaying circuits, and including means for synthesizing the output signals received from said delaying circuits, estimating said input signal before one symbol time based on said output signals received from said delaying circuits, and outputting an estimated delay signal; and a phase detection circuit connected to receive said input signal and said estimated delay signal and for comparing the phase difference between said input signal and said estimated delay signal and outputting demodulated data corresponding to the phase difference between said estimated delay signal and said input signal.

2. The delaying detection circuit according to claim 1, wherein said input signal is a binary PSK signal, wherein one time symbol $T = n/fc - \Delta t$ (where n is an integer, fc is the carrier frequency, and $0 \leq \Delta t < \frac{1}{2}fc$), and first and second delaying circuits are provided said first delaying circuit including means for delaying the input signal by $n/fc - \frac{1}{2}fc$, and said second delaying circuit including means for delaying the output signal of the first delaying circuit by $\frac{1}{2}fc$.

3. The delaying detection circuit according to claim 2, wherein the synthesis circuit includes means for estimating an input signal based on the average value between the output signal of the first delaying circuit and the output signal of the second delaying circuit, in the case where the input signal varies linearly.

4. The delaying detection circuit according to claim 3, wherein, in the case where $\Delta t = \frac{1}{2}fc$, the synthesis circuit comprises an inverter for inverting the output signal of the first delaying circuit and an averaging circuit for averaging the output of the second delaying circuit and the output of said inverter.

5. The delaying detection circuit according to claim 1, wherein the phase detection circuit comprises a multiplier for multiplying the input signal by the output signal of the synthesis circuit and a lowpass filter which rejects the passage of components of the output of said multiplier having a frequency not less than at least two times the carrier frequency.

6. The delaying circuit according to claim 1, wherein the input signal is a four-value PSK signal, and said plurality of delaying circuits comprises, a first delaying circuit for delaying an input signal provided to an input terminal thereof by a predetermined delay time, a second delaying circuit for delaying the output signal of said first delaying circuit by a predetermined delay time, a third delaying circuit for delaying the output signal of said second delaying circuit by a predetermined delay time, and said synthesis circuit comprises a first synthesis circuit for estimating an input signal from the output signal of said first delaying circuit and the output of said second delaying circuit and a second synthesis circuit for estimating an input signal from the output signal of said second delaying circuit and the output signal of said third delaying circuit, and said phase detection circuit comprises, a first multiplier for multiplying an input signal provided to said input terminal with the output signal of said first synthesis circuit, a first lowpass filter which rejects the passage of a component of a frequency not less than at least two times the carrier frequency in the output of said first multiplier, a second multiplier for multiplying an input signal provided to said input terminal with the output signal of said second synthesis circuit, and a second lowpass filter which rejects the passage of a component of a frequency not less than at least two times the carrier frequency in the output of said second multiplier.

* * * * *